(1.)
WILLIAM D. BROOKS.
Apparatus for Testing Cans, Barrels, &c.
No. 121,581. Patented Dec. 5, 1871.
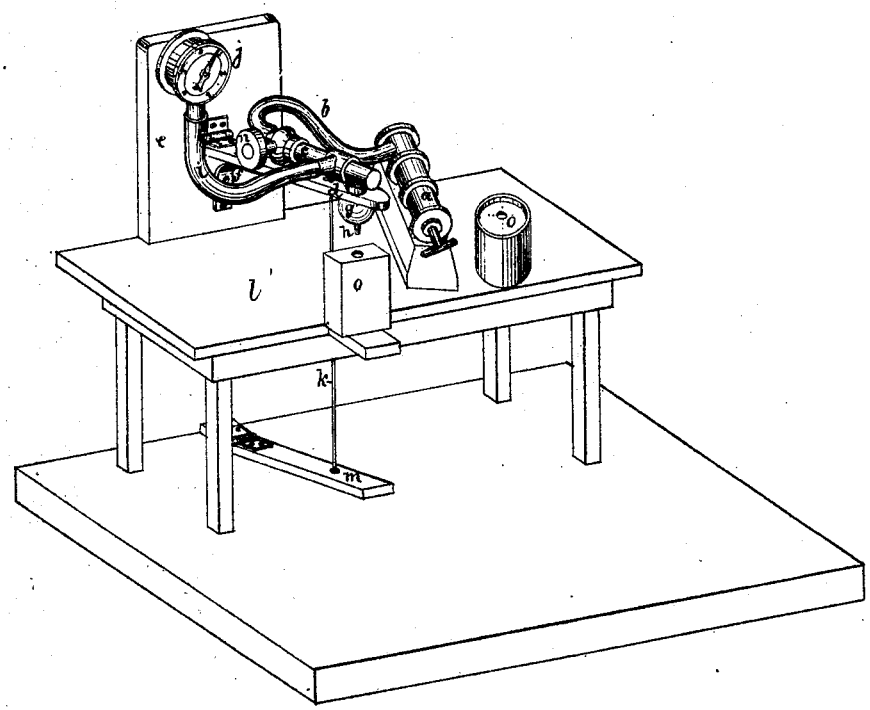

*Reissued Mar. 12th 1872*

121,581

UNITED STATES PATENT OFFICE.

WILLIAM D. BROOKS, OF BALTIMORE, MARYLAND, ASSIGNOR TO MARY C. BROOKS, OF SAME PLACE.

IMPROVEMENT IN APPARATUS FOR TESTING CANS, BARRELS, &c.

Specification forming part of Letters Patent No. 121,581, dated December 5, 1871.

*To all whom it may concern:*

Be it known that I, WILLIAM D. BROOKS, of Baltimore, in the county of Baltimore and State of Maryland, have invented a new and Improved Apparatus for Testing Cans, Barrels, &c.; and I do hereby declare that the following is a full, clear, and exact description of the same, reference being had to the accompanying drawing which forms a part of this specification.

The drawing is a perspective view.

This invention relates to an apparatus for testing cans, barrels, and other vessels by forcing air into the same, so that if the vessel is not perfectly tight the condensed air therein will leak out and indicate the spot where the hole is, the fact of leakage being revealed by the backward rotation of the index of a pressure-gauge that is connected with the force-pump.

Referring to the drawing, $a$ is a force-pump; $b$, a flexible tube connecting the force-pump with a pipe, $c$, that is attached to the top of an arm, $d$, hinged at one end to a standard, $e$, and supported by a spring, $f$, whose tendency is to keep the arm $d$ elevated somewhat. The outer end of the pipe $c$ is connected with a gum ball, $g$, attached to the lower side of the arm $d$ near the outer end of the same, said ball having a nozzle, $h$, extending downward from its under side. The pipe $c$ is furnished with a stop-cock, $n$, and is connected by means of a flexible tube, $i$, with a gauge, $j$, attached to the standard $e$ or other suitable support. A rod, $k$, passing down through the table $l$ that supports the force-pump, connects the arm $d$ with a treadle, $m$. The nozzle $h$ should, in the normal position of the arm $d$, be sufficiently elevated above the table $l$ to allow of the placing beneath the nozzle upon the table of a can, $o$, or other vessel.

When tightness is tested, by depressing the arm $d$ by means of the treadle $m$ until the nozzle $h$ enters the orifice in the top of the can, the gum ball $g$ closing said orifice completely, then, the cock $n$ being opened, the pump $a$ should be worked until both the can and the gauge are filled with condensed air at an equal pressure, which is indicated by the index of the gauge. For an ordinary square can the pressure should not be over two pounds to the square inch, while for a cylindrical can it may run as high as twenty pounds without injury. After stopping the pump, if the index of the gauge remains where it was carried by the pressure, this shows that there is no leakage from the can. On the other hand, if the index goes backward it shows that the can is leaking, and the place of leakage can be detected by passing a lighted lamp, taper, or candle around the can till the current is reached. It is not absolutely necessary to employ the gauge, as anything that can be visibly or tangibly affected by air-pressure and the decrease thereof, such as a gum ball, will answer the same purpose, though not quite so well.

Having thus described my invention, what I claim as new, and desire to secure by Letters Patent, is—

1. The combination of the hinged and spring-supported arm $d$, treadle $k$ $m$, pump $a$, flexible tube $b$, and pipe $c$, as shown and described, for the purpose specified.

2. The combination of the pump $a$, hinged arm $d$, gauge $j$, flexible tubes $b$ and $i$, pipe $c$, ball $g$, and treadle $k$ $m$, as shown and described.

The above specification of my invention signed by me this 17th day of October, A. D. 1871.

WM. D. BROOKS.

Witnesses:
SOLON C. KEMON,
THOS. D. D. OURAND.

(1)